United States Patent [19]

Haner

[11] Patent Number: 5,336,956
[45] Date of Patent: Aug. 9, 1994

[54] BRUSHLESS DYNAMO MACHINE WITH NOVEL ARMATURE CONSTRUCTION

[76] Inventor: Lambert Haner, 1975 Wynwood Dr., Rocky River, Ohio 44116

[21] Appl. No.: 980,304

[22] Filed: Nov. 23, 1992

[51] Int. Cl.$^5$ .................. H02K 1/00; H02K 3/00
[52] U.S. Cl. ..................... 310/179; 310/71; 310/68 R
[58] Field of Search ............ 310/68 R, 68 B, 71, 310/179, 90, 154, 173, 181, 264, 195, 206–207

[56] References Cited

U.S. PATENT DOCUMENTS

| | | | |
|---|---|---|---|
| 2,479,279 | 8/1949 | Tooley | 172/287 |
| 2,772,046 | 11/1956 | Shomphe | 230/117 |
| 2,895,666 | 7/1959 | Girdwood et al. | 230/117 |
| 2,929,944 | 3/1960 | Shewmon | 310/67 |
| 3,484,635 | 12/1969 | MacKallor, Jr. | 310/266 |
| 4,121,127 | 10/1978 | Adelski et al. | 310/67 R |
| 4,668,898 | 5/1987 | Harms et al. | 318/254 |
| 4,694,210 | 9/1987 | Elliott et al. | 310/68 R |
| 4,774,428 | 9/1988 | Konecny | 310/198 |
| 4,882,511 | 11/1989 | von der Heide | 310/67 R |

*Primary Examiner*—Steven L. Stephan
*Assistant Examiner*—E. To
*Attorney, Agent, or Firm*—Pearne, Gordon, McCoy & Granger

[57] ABSTRACT

Brushless dynamoelectric machines utilizing conventional DC armature construction. The winding of the armature is modified by providing a set of three leads to its coil ring circuit at points spaced angularly about 120°. Electrical energy is carried in these leads instead of a commutator and brush set. In most versions of the machine, a shell rotates about the armature, while the armature is caused to remain stationary. The three lead lines are brought out parallel to the axis of rotation through a bearing supporting the shell.

16 Claims, 16 Drawing Sheets

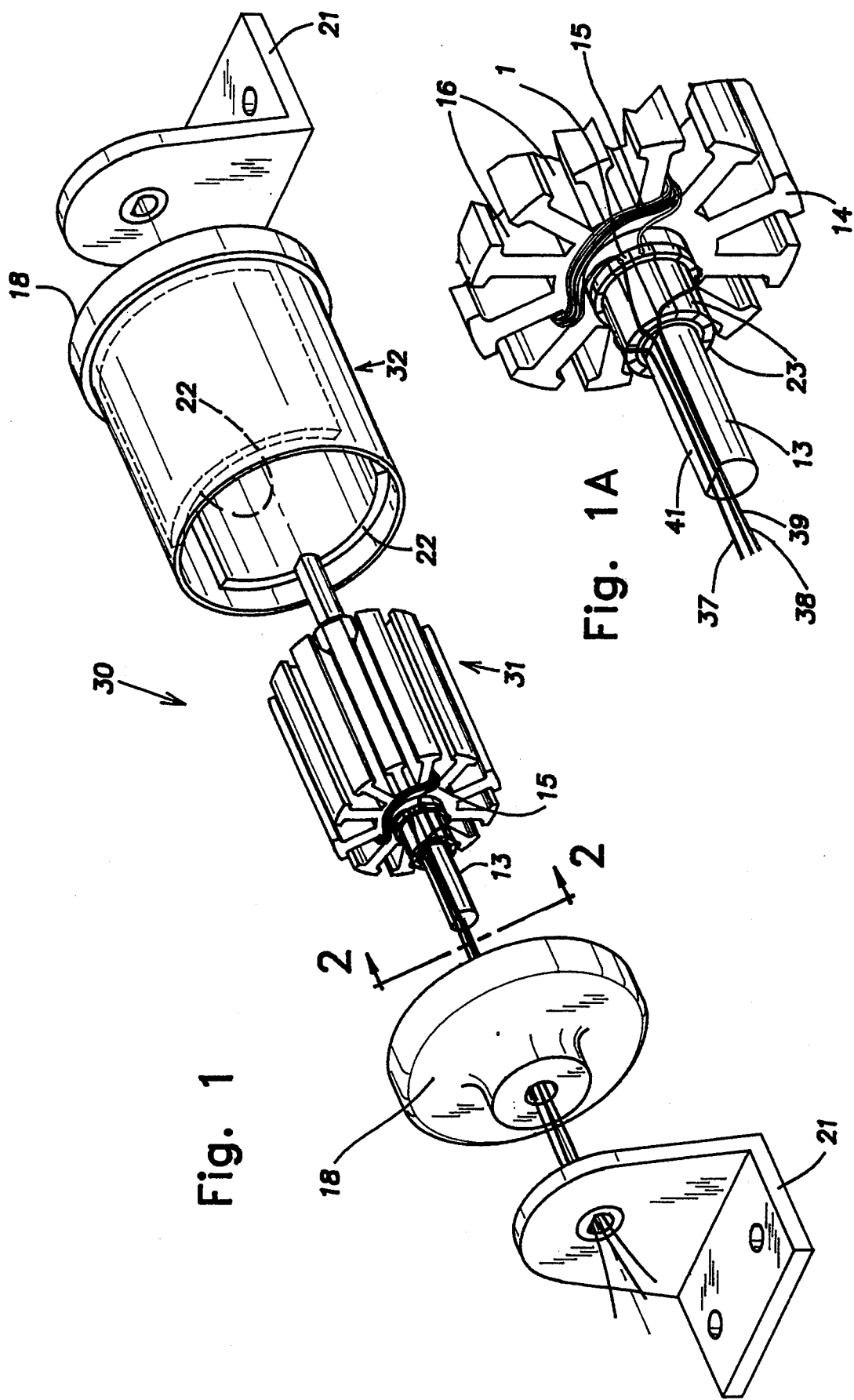

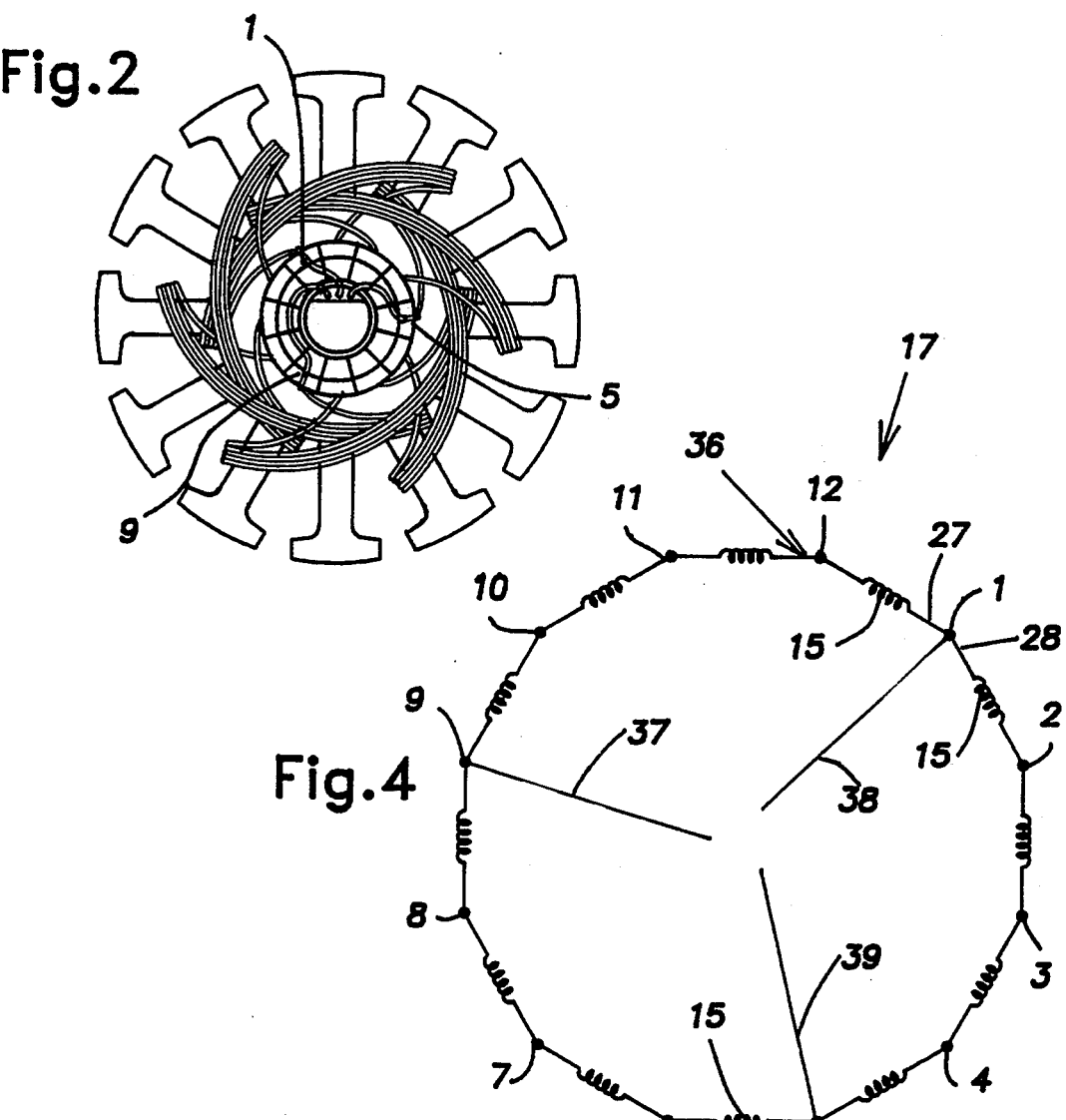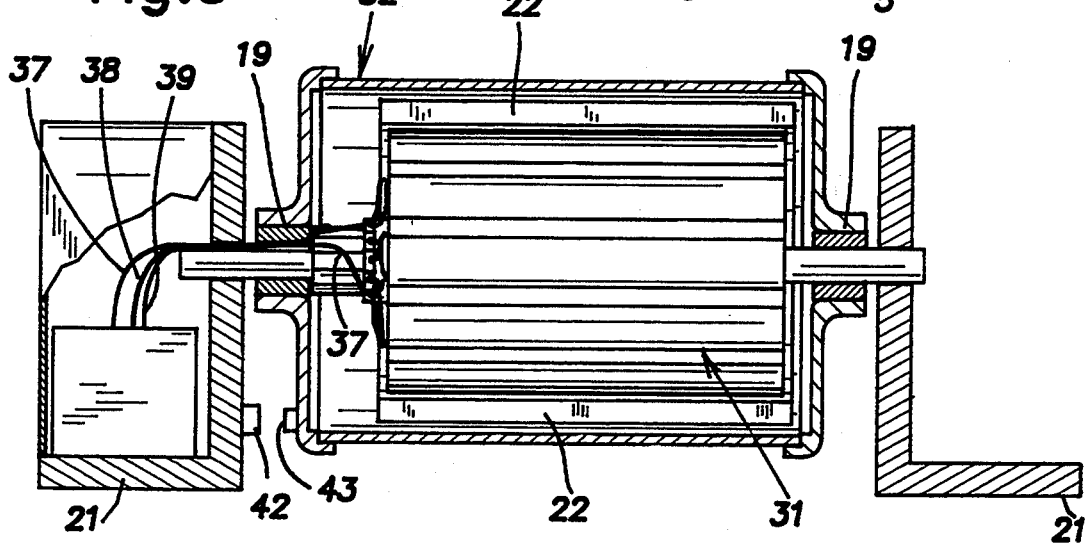

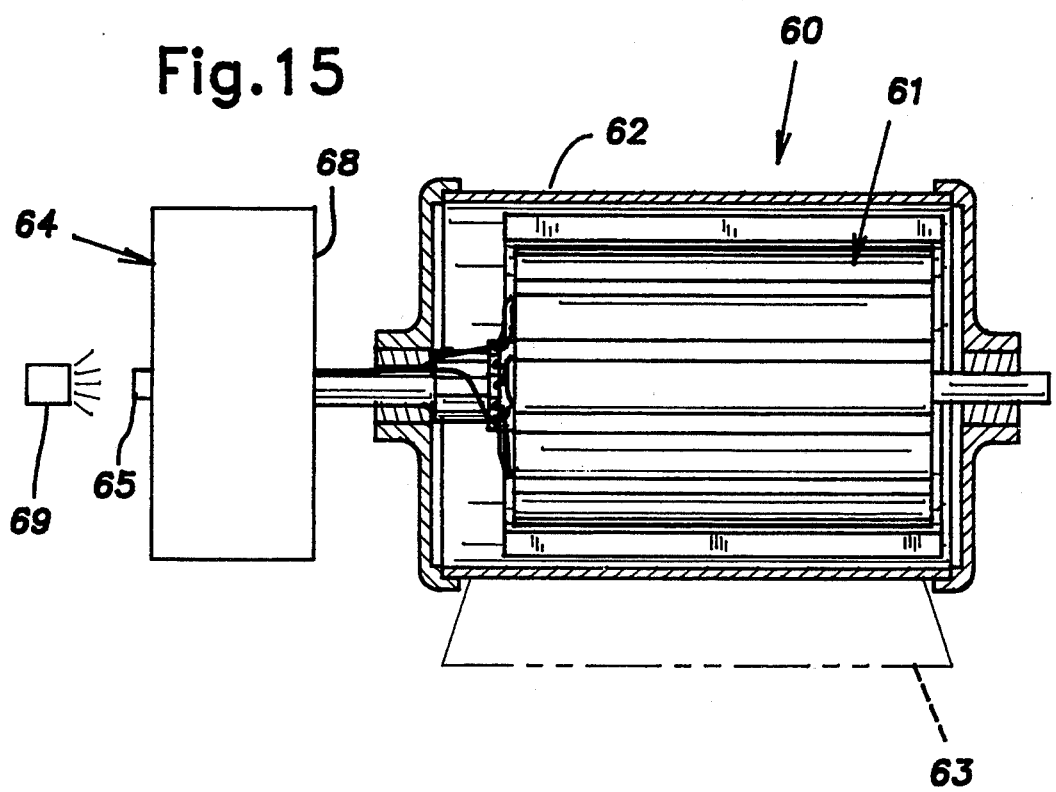
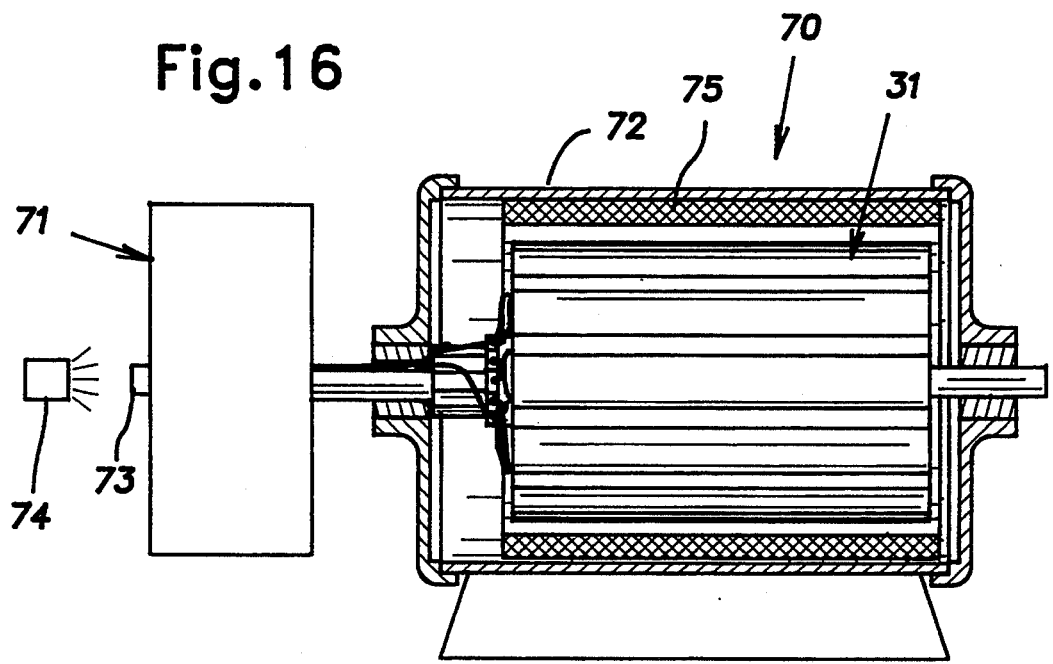

BRUSHLESS DYNAMO MACHINE WITH NOVEL ARMATURE CONSTRUCTION

BACKGROUND OF THE INVENTION

The invention relates to dynamoelectric machines and in particular to methods and apparatus for adapting components of direct current brush/commutator type machines for use in brushless machines.

PRIOR ART

Brushless DC motors have been developed to overcome the disadvantages of brush/commutator motors. Brush/commutator motors, and generators are ordinarily limited in service life and/or require periodic maintenance because of brush and commutator wear. In general, brushless direct current motors are characteristically relatively expensive owing, at least in part, to their typical specialized designs and low volume production.

SUMMARY OF THE INVENTION

The invention provides brushless dynamoelectric machines that enable conventional DC armature construction produced by long established fly winding techniques to be used without brushes to thus provide the long life characteristics of a brushless motor and a large potential reduction in manufacturing costs.

The invention is based on a simple modification to the winding circuit of an otherwise generally conventional DC armature. Typically, the windings have coils distributed around the core of the armature, the individual coils being interconnected in a closed loop or ring circuit. In practicing the invention, each of three additional lead wires is connected to the coil circuit ring at points spaced angularly about 120°. Relative rotation between the armature and a surrounding housing shell is provided by bearings at opposite ends of the armature in a generally conventional manner. However, in most versions of the invention, the shell is arranged to rotate while the armature is caused to remain stationary. The three lead lines connected to the armature coil ring circuit are brought out of the housing shell from the coils through one of the end bearings. Since there is no rotation of the armature to which the wires are fixed, there is no need for brushes, a commutator or slip rings. The three leads, in certain disclosed embodiments of the invention, are all excited by three phase power developed by an associated power supply. In other disclosed embodiments where the dynamoelectric device is used, for example, as a brake rather than as a motor, the leads can be connected to a circuit that dissipates generated electrical power.

The disclosed embodiments utilize components that are the same or are like those presently manufactured for DC machines and, therefore, affords great savings in tooling, including coil winding machinery, processing, assembly and inventory costs. The disclosed embodiments also have beneficial speed/torque characteristics, efficiency, power factor and/or power-to-weight ratio.

BRIEF DESCRIPTION OF THE DRAWINGS

FIG. 1 is a somewhat schematic exploded perspective view of a brushless electric motor constructed in accordance with the invention;

FIG. 1A is an enlarged view of the commutator end of the armature of the motor of FIG. 1;

FIG. 2 is an axial view of the armature of the motor of FIG. 1;

FIG. 3 is a cross-sectional view of the motor of FIG. 1 taken in a longitudinal plane;

FIG. 4 is a schematic electrical drawing of the armature windings;

FIG. 15 schematically illustrates a brushless generator in a cross-section taken in a longitudinal plane;

FIG. 16 schematically illustrates a motor of novel construction in a cross-section taken in a longitudinal plane;

DESCRIPTION OF THE PREFERRED EMBODIMENTS

Figure 5:
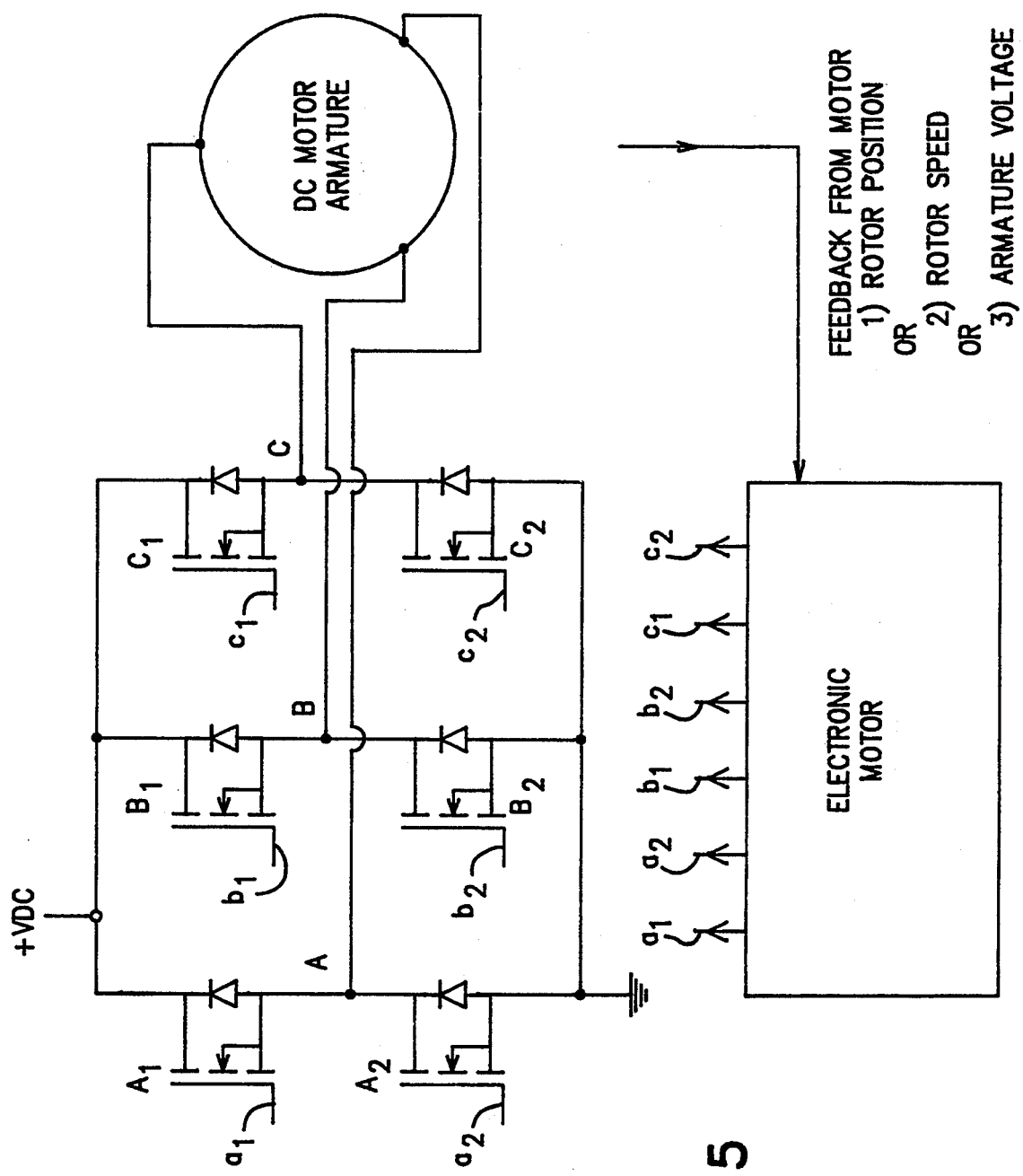
FIG. 5 is a block diagram of an electrical power bridge control.

Referring to FIG. 1, a brushless DC permanent magnet motor or dynamoelectric machine 30 constructed in accordance with the invention is shown. The motor 30 includes a non-rotating armature 31 and a rotating housing shell 32 encircling the armature 31. The armature 31 includes a central shaft 13 on which is fixed an axial stack of steel laminations forming an armature core 14. The core 14 has a plurality of axially extending slots 16 distributed angularly around its generally cylindrical body. The slots 16 are open at an outer periphery of the core 14. Coils 15 of an armature field winding 17 are wound in all of the slots 16, but for visual clarity only one coil 15 is illustrated in FIG. 1. (In general, it will be understood that the coils 15 substantially fill the space of the slots 16 but for simplicity and visual clarity only a limited number of turns of the coils are shown in FIG. 2.) The housing shell 32 has end bells 18 fixed on its ends; mounted in central bosses on the end bells are bearings 19 which support the housing shell for rotation about its axis coincident with the axis of the armature shaft 13. The illustrated bearings 19 are sleeve bearings, but other suitable bearing constructions such as antifriction bearings can be employed.

The armature shaft 13 in this embodiment is held stationary, i.e. non-rotational, with respect to the location of the motor 30 by mounting brackets 21 and the housing shell 32 rotates on the bearings 19 about the axis of the shaft 13 when the motor operates. The housing shell 32 has a pair of diametrically opposed permanent magnets 22 fixed to its interior and forming two magnetic poles.

The armature 31 is constructed, with notable exceptions detailed below, in substantially the same manner as is the armature of a conventional DC machine. Typically, [with a lap or a wave winding] there are as many commutator sediments 23 as there are coils 15.

Each coil 15 of the armature winding 17 is a multiturn element with the sides of each turn, as suggested in FIG. 1, being in slots 16 in the body of the core 14 that are generally diametrally opposed from one another. The sides of turns of more than one coil 15 can be wound in a single slot 16. As suggested in FIG. 1, the wire of each typical coil 15 has its ends 27, 28 electrically connected to an adjacent pair of commutator segments 23 that are generally midway, i.e. spaced nearly 90° about the motor axis from the core slots 16 in which the coil 15 is wound. In the illustrated motor 31, there are twelve slots 16, twelve coils 15 and twelve commutator segments 23. The commutator segments 23 are numbered 1 through 12 for reference purposes. The result is that the coils 15 have their ends each electrically connected to a commutator segment 23 that it shares with the next adjacent coil 15, in an angular sense. The commutator segments 23, in effect, form terminals for connecting the ends 27, 28 of adjacent coils 15. The coils 15 form an electrical circuit 36 diagrammatically illustrated in FIG. 4 where they are in a closed loop or ring. The coil ends 27, 28 are joined at the terminal points formed by the commutator segments 23.

The armature 31 as so far disclosed follows essentially long established custom and design in its construction, assembly and winding. In accordance with an important aspect of the invention, three lead wires or conductors 37, 38, 39 not previously employed in conventional armature windings, are electrically connected to three points on the closed ring circuit 36 formed by the coils 15. These lead wires 37–39, ideally, are connected at points which are angularly spaced at or about 120° on the circular ring 36. This is accomplished, with reference to FIGS. 1 and 3 by connecting these leads 37–39 such as by soldering, to every fourth commutator segment, namely, segments 1, 5 and 9.

It will be understood from the disclosure that the use of commutator segments 23 is optional and a matter of choice. The commutator segments 23 are a convenient and customary means of terminating and connecting the ends 27, 28 of adjacent coils and when used, can be produced from existing inventory, tooling and assembly techniques. However, various other wire end termination and connection means can be used in lieu of the commutator segments including clips, solder, weld joints and the like.

The leads 37–39 are brought out of the housing shell 32 by threading them through the center of the adjacent bearing 19. A simple way of accommodating the leads 37–39 through the bearing 19 is to form a flat 41 on the adjacent end of the shaft 13 large enough to receive the leads without interfering with the inside diameter of the bearing. Other formations, such as, for example, multiple flats, a slot or slots, or an axial bore can be provided in the shaft 13 for accommodating the leads 37–39 through the bearing.

The leads 37–39 divide the coil ring 36 into three phase groups such that when three phase power is applied to their distal ends a rotating magnetic field is produced by the coils 15 around the stationary armature 31.

The rotating field, produced by the armature coils 15 reacts with the magnetic poles on the housing shell formed by the permanent magnets 22 to cause the housing shell to rotate with a speed determined by the frequency of the three phase power supplied to the leads 37–39.

Figure 6:
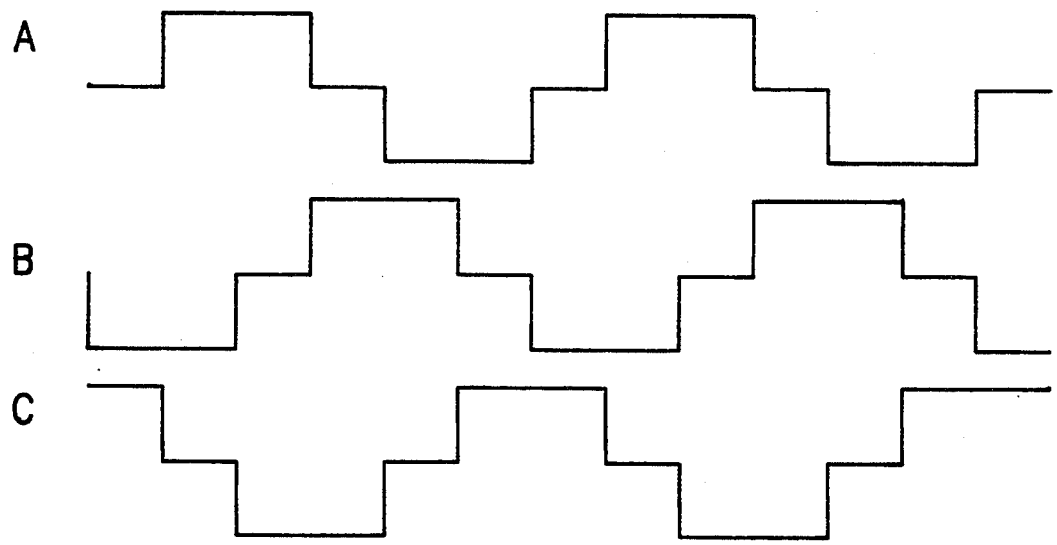
FIG. 6 is a diagram showing a typical switching time sequence for the bridge control of FIG. 5.
Figure 7:
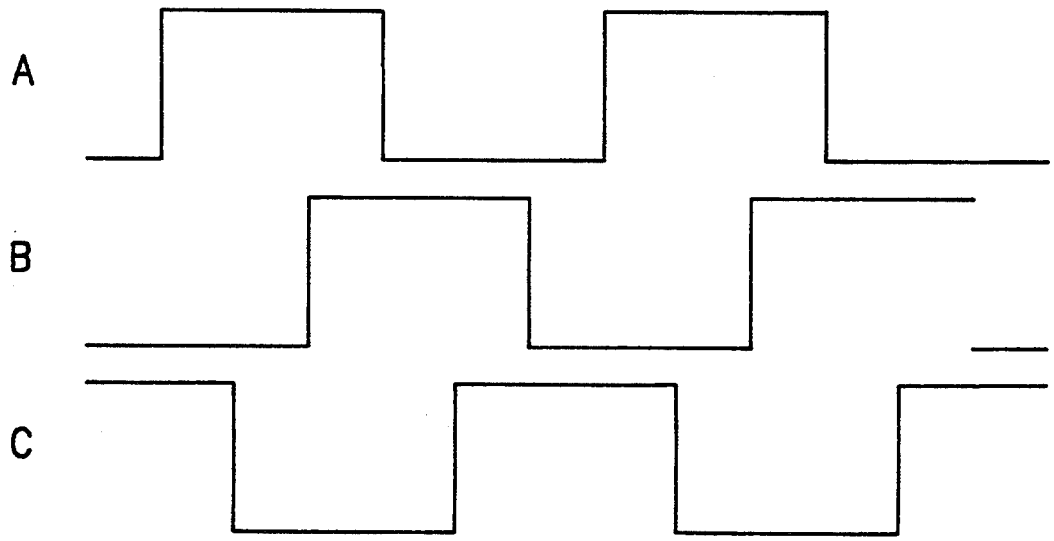
FIG. 7 is a diagram of a typical voltage waveform when the motor running speed is synchronized with the switching frequency of the bridge control of FIG. 5.

The required electrical power for the motor 30 can be supplied from a direct current power source VDC by using a solid state three phase power bridge with an associated electronic control. A generalized block diagram of a power bridge control is shown in FIG. 5. FIG. 5 shows a three phase power bridge constructed with six power MOSFET transistors labelled A1, A2, B1, B2, C1, C2. The electronic control determines which transistor or transistors are to be turned on or off via the control lines a1 through c2. When transistor A1 is turned on (then A2 must not conduct) the line for phase A is connected to the positive level of the power supply VDC. When transistor A2 is turned on (then A1 must not conduct) the line for phase A is connected to the negative (or ground) of the DC power supply. The same is true for the B leg and the C leg. A typical switching time sequence for the power bridge is shown in FIG. 6. Shown in FIG. 7 is a typical voltage waveform when the motor is up to a running speed and is synchronized with the switching frequency. The reason that the waveforms in FIG. 7 become square waves is because the back emf of the motor, as the rotor or housing shell 32 is revolving, is determining the voltage level during the period when neither transistor of the particular leg of the bridge is turned on. If the rotor were stalled then the waveform would be different.

In order for the motor to run continuously in one direction or the other the switching of the power transistors must be synchronized with the position of the permanent magnets 22 in the rotor 32 with the magnetic field created by the three phase connections of the armature. The electronic control and the power bridge must accomplish the switching of power to the armature that was previously accomplished by the carbon brushes in the brush type construction. The switching of power is in synchronization with the rotation of the rotor and magnets so that the motor will not stall out. The synchronization can be implemented in many ways. For example, rotor position is sensed relative to the armature by Hall effect devices or photo electric devices or other means diagrammatically indicated at 42, 43 in FIG. 3. When the rotor 32 rotates a prescribed amount the electronic control will switch the conduction of the transistors which reconnects the three phase wires to the VDC power supply and hence changes the magnetic field orientation in the armature. With rotor position feedback, the synchronization is exact from stall to any operating speed. Position sensing is, however, an added expense and also requires additional wire leads to the control from the motor, but the synchronization of motor speed and power frequency can be accomplished by other means.

Figure 8A:
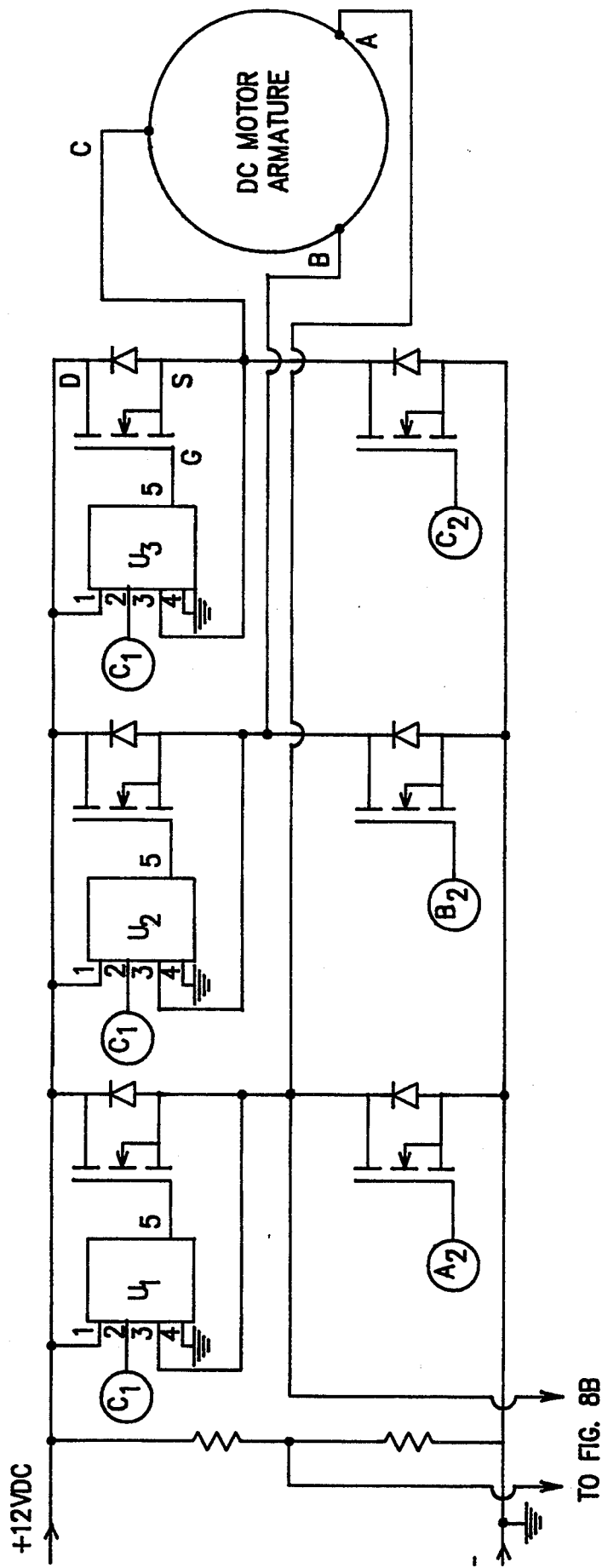
FIG. 8 (A and B) is a schematic diagram for a power control circuit operating from a 12 volt DC power source.
Figure 8B:
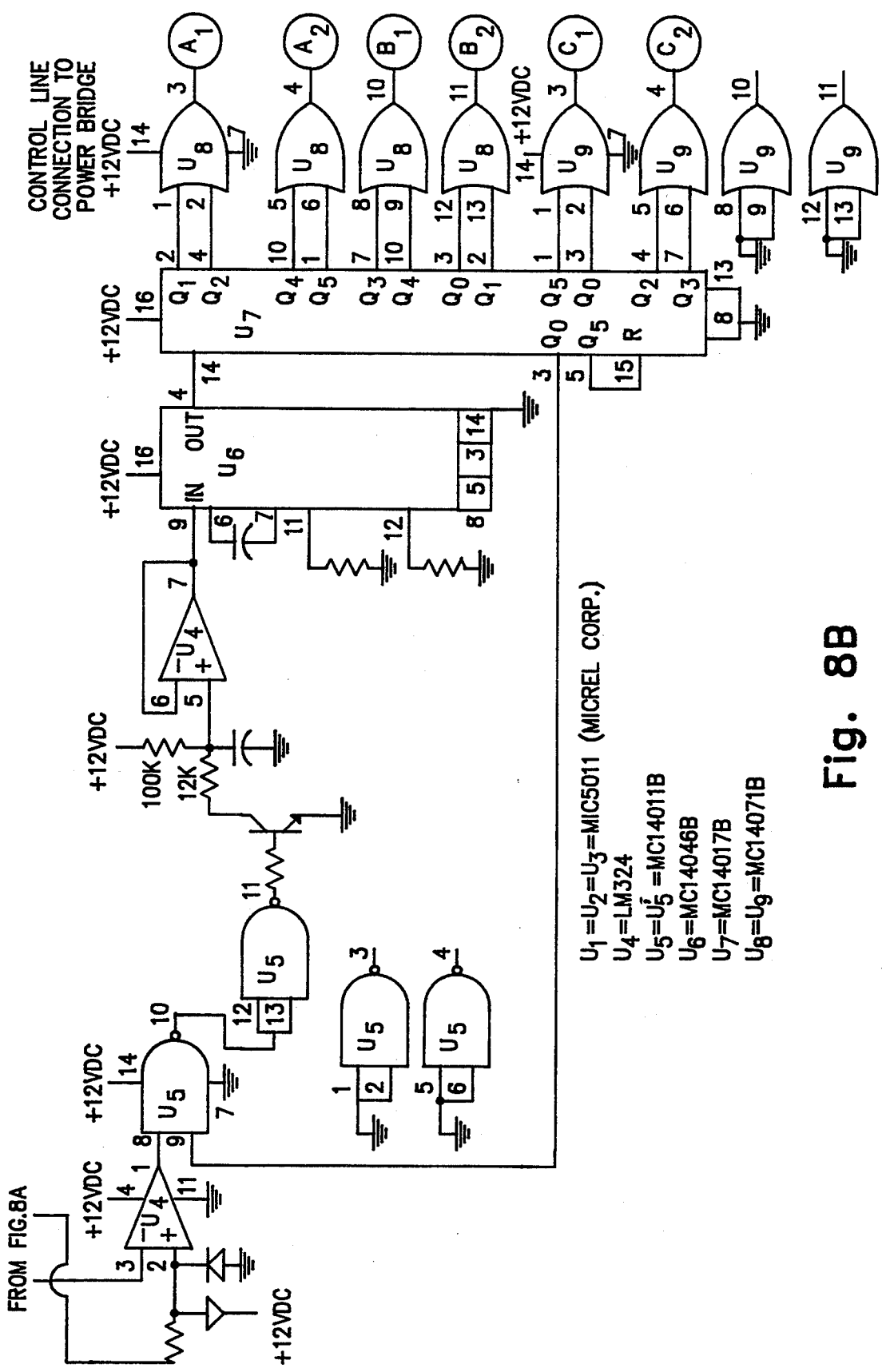

Sensing the armature voltage waveform or the effect of the back emf is a simple low cost method of synchronizing motor speed and power frequency. This invention includes a new and novel circuit designed to accomplish this. A schematic diagram for a power control circuit operating from a 12 volt DC power source is shown in FIG. 8. A voltage controlled oscillator is formed by the integrated circuit U6 (MC14046B). This circuit is formally a phase locked loop control, but it does contain a voltage to frequency converter and it is relatively inexpensive. The output of the oscillator is fed into a ring type decade counter U7 (MC14017B). This counter has the Q5 output connected to the reset input so that the counter has only six states. Each count state is a separate output designated Q0, Q1, Q2, Q3, Q4 and Q5. The outputs are combined in the two input OR type logic gates U8 and U9 (MC14071B). The output of these gates form the switch control signals for the power transistor. The switch control lines are designated as A1, A2, A3, A4, A5 and A6.

Figure 9:
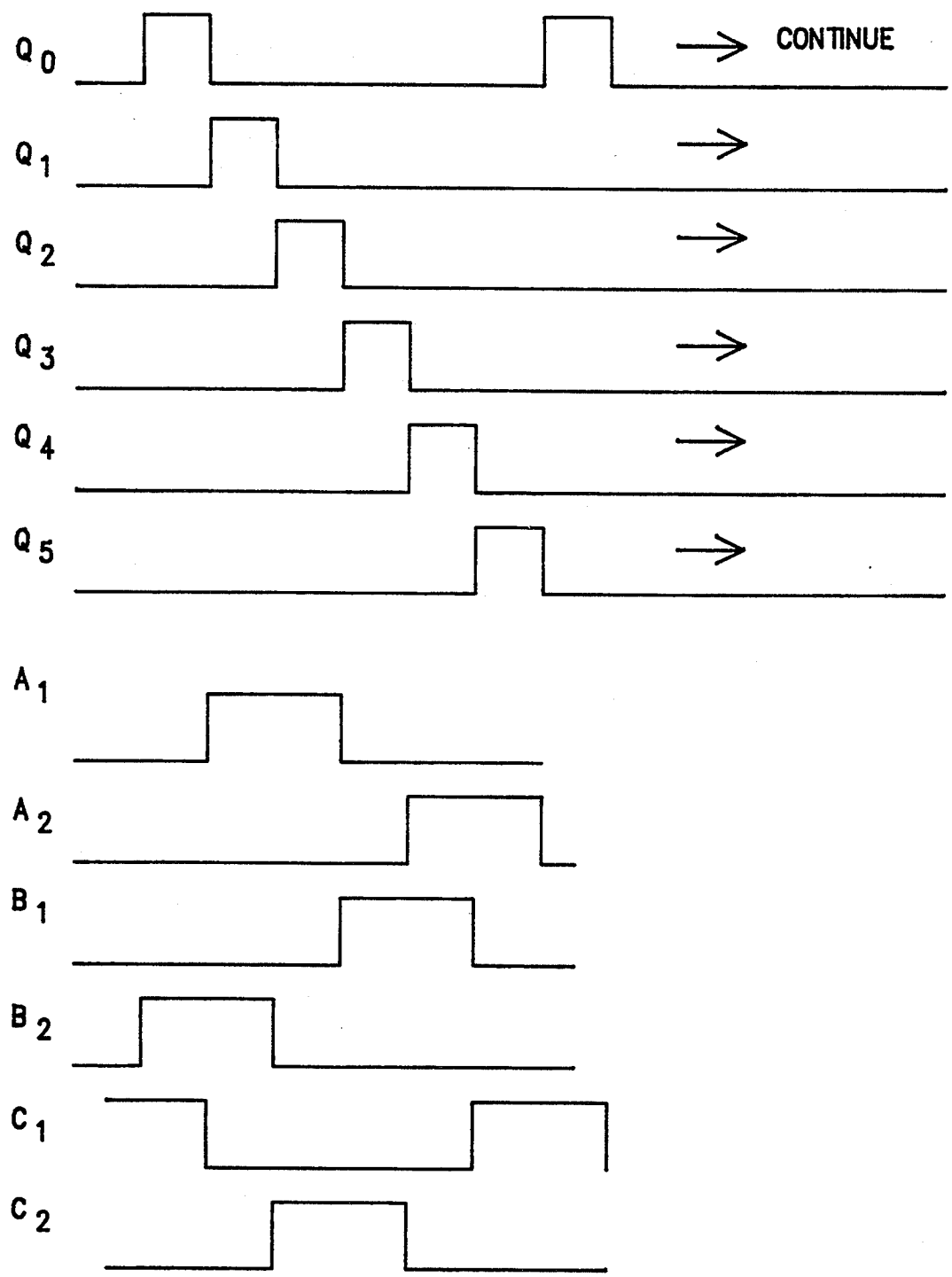
FIG. 9 shows the output signals of the circuit of FIG. 8 as a function of time for a counting cycle.

FIG. 9 shows the output distribution of these signals as a function of time for one complete counting cycle.

Figure 10:
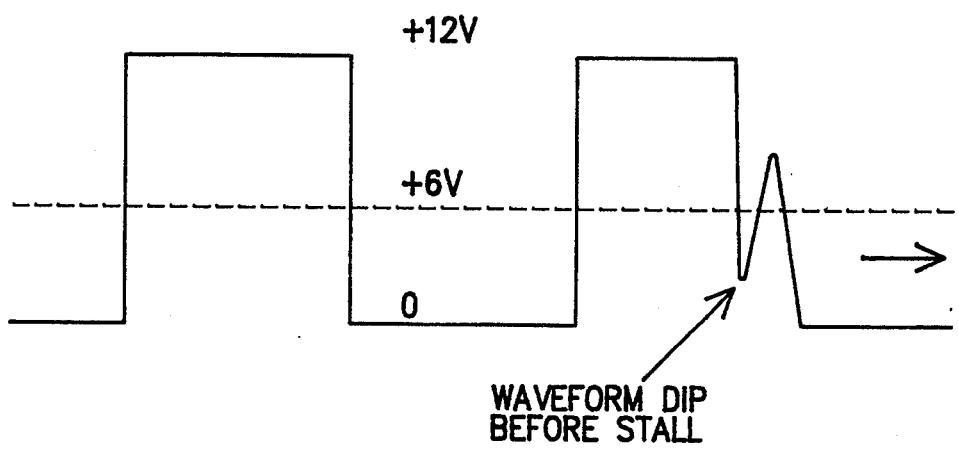
FIG. 10 illustrates the voltage waveform on the three phase power lines to the motor.

When the motor is running at some speed the frequency of the oscillator U6 is in exact synchronization at a frequency of six times the applied power bridge waveform frequency. The rotating field created at the armature is synchronous with the rotor. The voltage waveforms are as shown in FIG. 7. When the load torque increases more current must flow into the armature windings to produce that torque. Practically, the only way this can happen is for the back emf to decrease because the current flow into the windings causes a voltage drop due to the resistance of the windings. In order for the back emf to decrease the frequency must decrease. This reduction in frequency is accomplished by the circuitry associated with U4 and U5. As the torque load increases, the rotor will phase back slightly before stalling out. The voltage waveform on the three phase power lines will have a dip as shown in FIG. 10. This voltage dip falls below ½ of the DC supply voltage. The operational amplifier U4 and pin #2 is connected to phase A to monitor that waveform. Pin #3 of U4 is biased slightly above ½ V of the supply voltage (supply voltage is shown as +12 volts DC). When the dip occurs the output of the U4 op amp pin #1 will go positive. At the count state of Q0 the input of pin #9 U5 goes positive. The Q0 state corresponds to that section of the waveform that we wish to monitor and no other state. Subsequently, pin #10 U5 goes low, pin #11 U5 goes high, this turns on the transistor 2N4401. The 22 mfd capacitor begins to discharge through the 12K resistor. This lowers the voltage on the capacitor, this lowers the voltage at pin #7 U4 and lowers the frequency out of U6 pin #4. The dip in the waveform is of short time duration and hence the change in voltage and decrease in frequency is incremental. The rotor speed will drop accordingly. This process continues as needed to arrive at a stable operating condition. When the torque load is reduced, the voltage on the 22 mfd capacitor will increase to bring the frequency up and raise the rotor speed. The RC time constants are selected for the application. On start-up the 22 mfd capacitor is at or near zero volts. The voltage begins to ramp up and hence ramps up the frequency. The motor will accelerate up to speed. Additional circuitry may be added as necessary to accommodate the system dynamics for the application at hand.

A brushless DC induction motor can be constructed in a manner similar to that described in connection with FIGS. 1 through 4 with the modification that the rotor or housing shell is a steel cylinder without permanent magnets. The armature 31 is as described above for the motor 30.

Figure 11A:
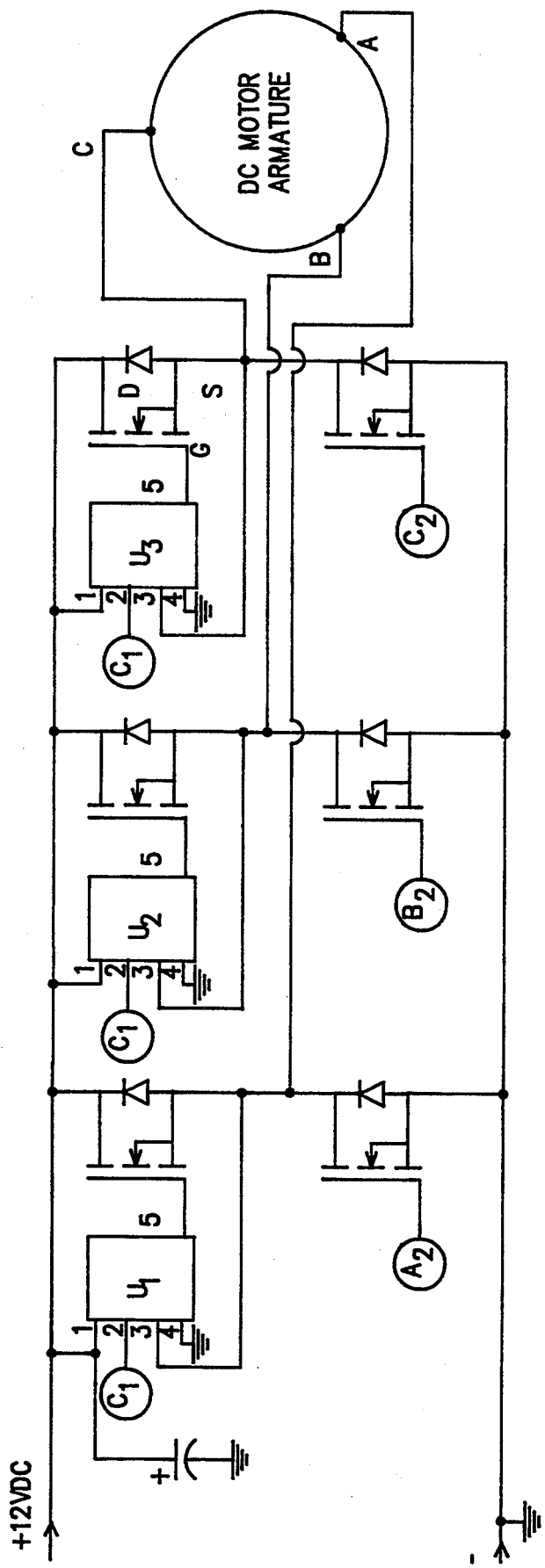
FIG. 11 (A and B) shows a low cost power inverter for an induction motor.
Figure 11B:
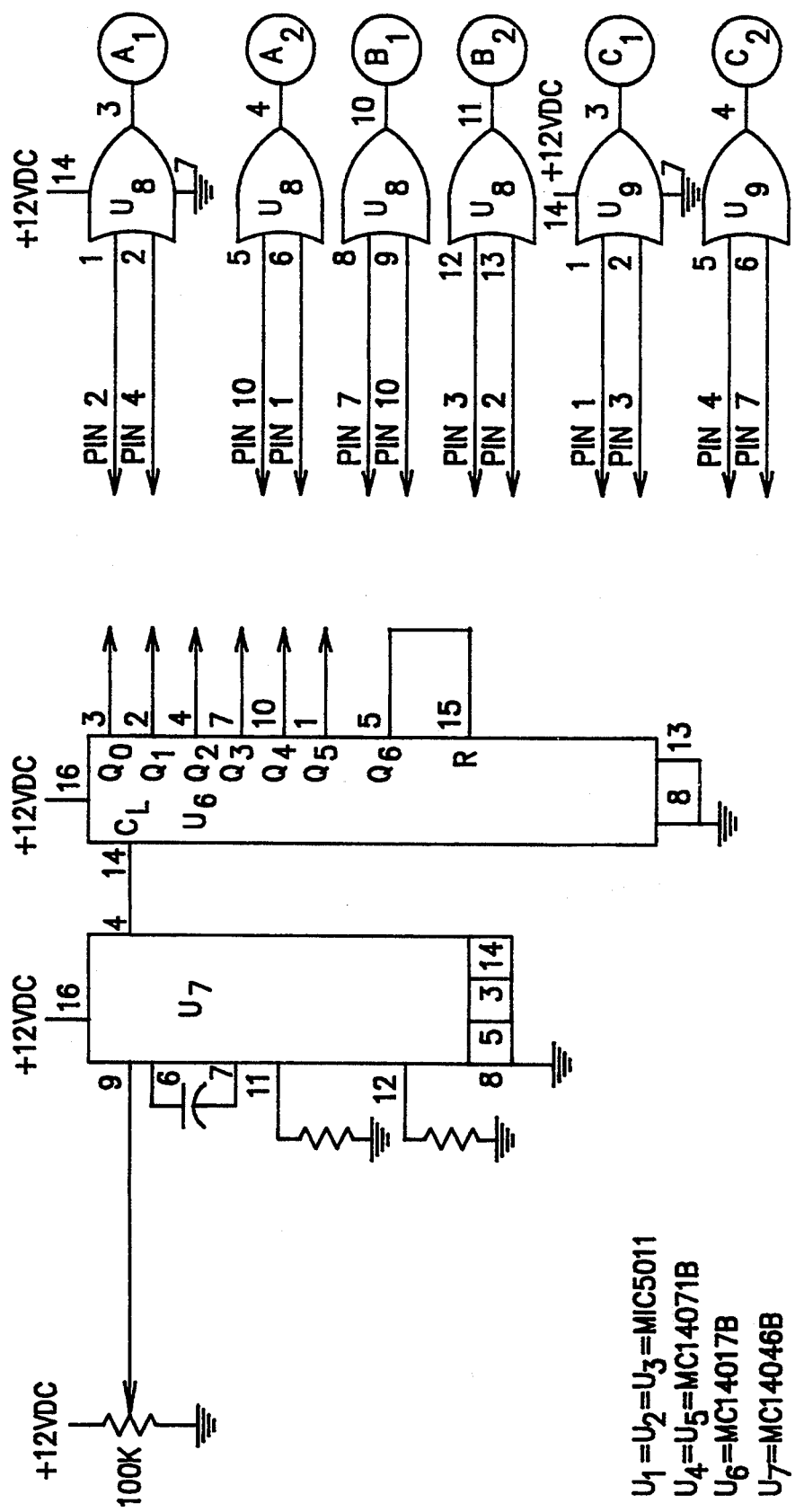
Figure 12:
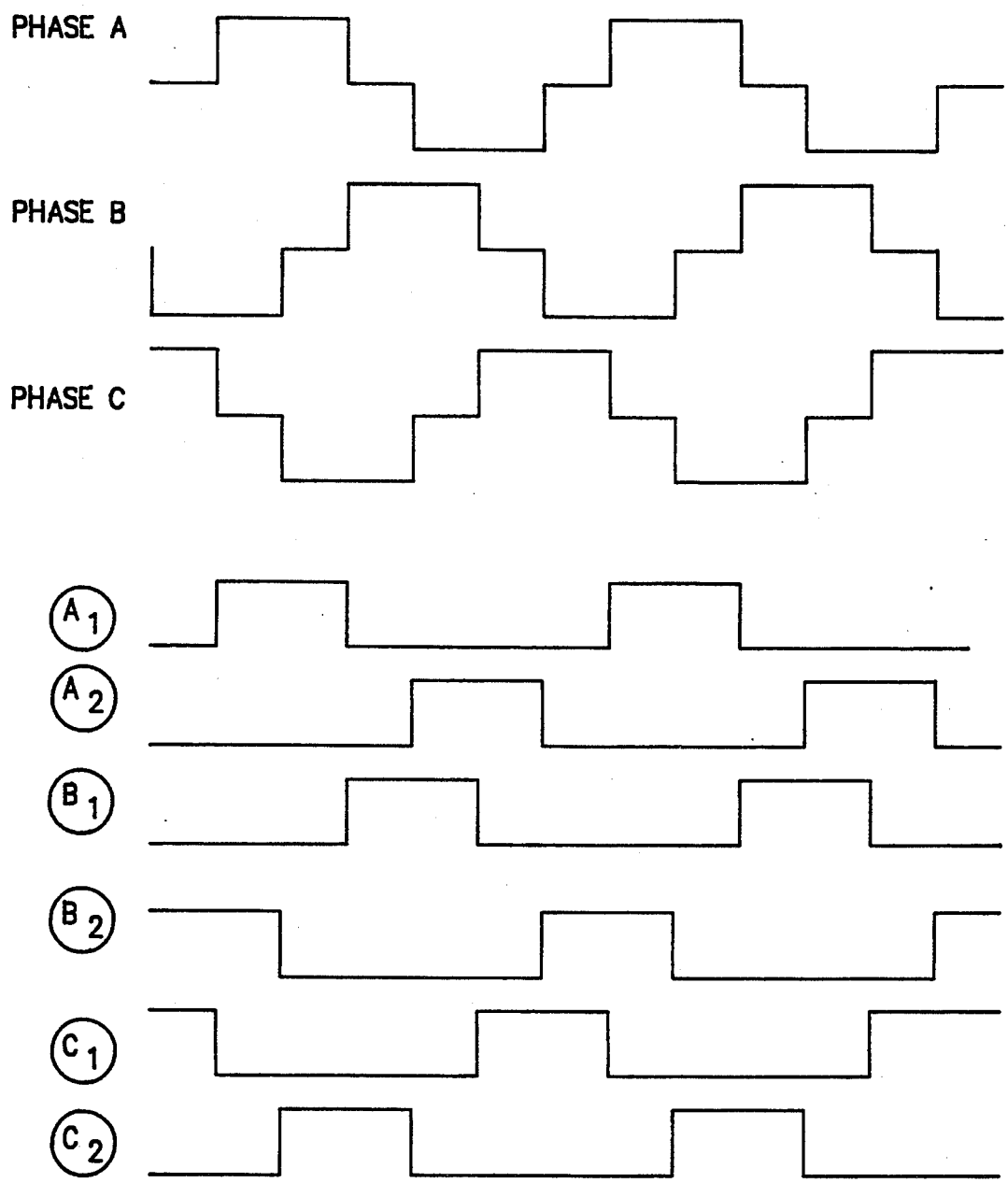
FIG. 12 illustrates the voltage and control waveforms for the inverter of FIG. 11.

The electronic schematic shown in FIG. 11 depicts a simple low cost power inverter for an induction-type motor. The six power transistors, e.g. type IRFZ40, comprise a three phase power bridge for the inverter. The "turn-on" and "turn-off" switching control to the transistors form what is commonly termed a "six-step" inverter. The voltage and control waveforms are shown in FIG. 12. The frequency adjustment control is shown as a 100K potentiometer in FIG. 11.

The wiper arm of the potentiometer feeds into pin #9 of integrated circuit U7. U7 (like element U6 in FIG. 8) is a MC14046B phase locked loop device that has a voltage to frequency converter circuit built into it. This V-F converter circuit is used to create a variable frequency at the output pin #4 of U7. This frequency is fed into pin #14 of U6 which is a decade ring counter MC14017B. For each pulse input the counter will advance one state from Q0 - Q1 - Q2 - Q3 - Q4 - Q5 in sequence and then return to Q0 because output Q6 pin #5 is connected to the reset input. The outputs are in time sequence with each output in the logic high state whenever the counter is at that count state and logic low for all others. The integrated circuits U4 and U5 are logic functions defined as two input "OR" functions. The time distributed outputs from the counter U6 are combined in these logic circuits to provide the drive control signals for the power bridge designated as A1 through C2. The circuits labelled U1, U2 and U3 are high side drivers for the power MOSFET in the upper legs of the power bridge. The power bridge is shown to operate from a 12 volt DC power source, but higher voltages can be used with different selected parts in the power bridge.

The efficiency of the solid iron or steel rotor running at high speeds based for example on 300 HZ power can be the same as a more expensive conventional squirrel cage induction motor running at low speeds based, for example on 60 HZ power. The solid steel rotor is very efficient at certain operating conditions, and the rotating hollow cylinder design is most capable of high speed operation. This design also develops more power because of the higher speed operation. The power output to weight ratio of the motor operating at high speeds is larger than that of standard motors operating directly from 60 HZ power.

The dynamoelectric machine or brushless motor 30 described in connection with FIGS. 1–4 can be used as a brushless generator. In this application mechanical power is used to rotate the permanent magnet housing 32 and electrical power is extracted from the leads 37–39 connected to the commutator segments 23 on the stationary armature 31 and brought out along the flat 41 on the stationary armature shaft 13. The electrical power is in AC form with the frequency and amplitude proportional to the rotational speed of the permanent magnet housing 32. To obtain DC power a full wave bridge rectifier can be used. The electrical power can be used to supply the required power to functional electrical apparatus as the application dictates.

Figure 13:
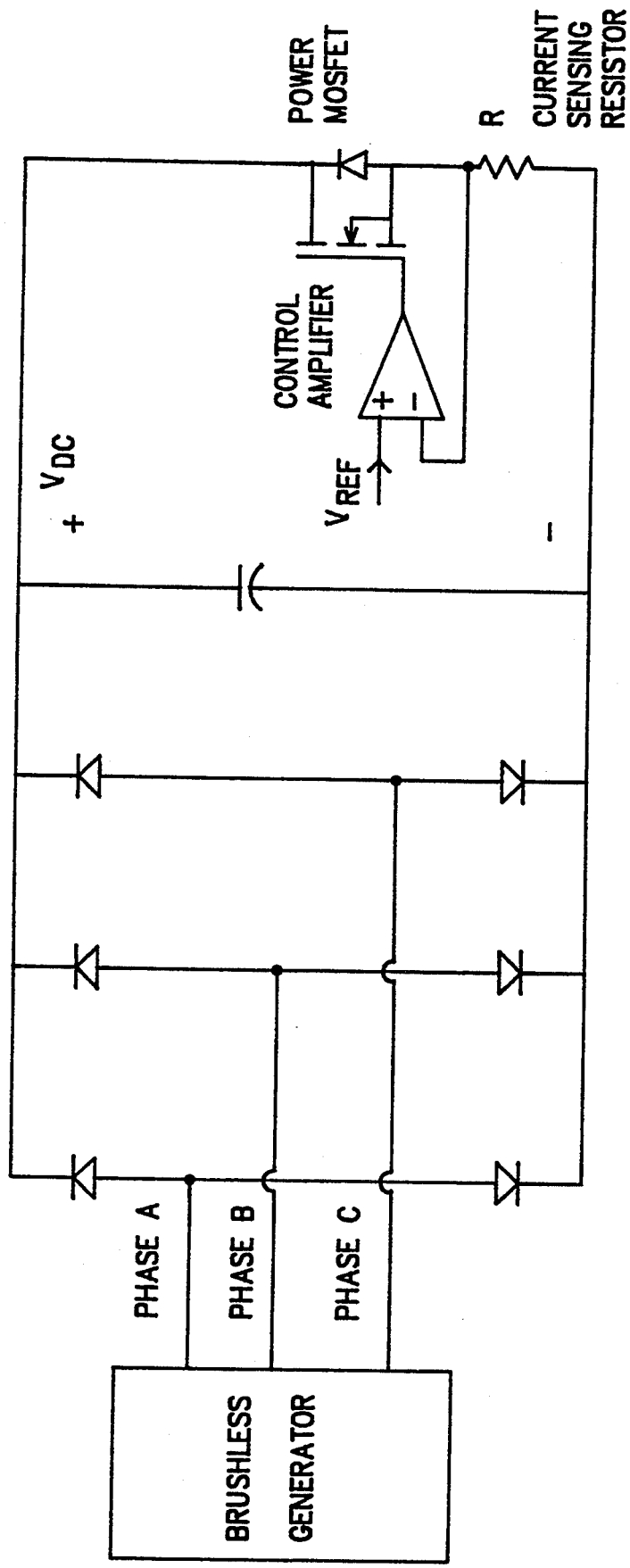
FIG. 13 shows a circuit that operates to maintain a constant current load.

Another application using the machine 30 as a generator is that of a mechanical loading device to provide tensioning or to dissipate mechanical power. If a constant tension is required the generator 30 can be loaded by electronic means to maintain a constant torque merely by maintaining a constant current load on the electrical output from the generator. FIG. 13 shows a circuit that operates to maintain a constant current load. The electrical power is brought out on the three lead lines 37–39 connected to the commutator segments 23 that are displaced substantially 120° from each other. This constructs three phase power labelled as phase A, phase B and phase C. This power is rectified as VDC. A power transistor (a power MOSFET is shown) is connected across the DC power VDC. A current sensing resistor R is connected in series with the power transistor and is used to sense the current. A control amplifier compares a reference voltage (VREF) to the voltage across the current sensing resistor R. The amplifier output is connected to the gate of the power MOSFET. The amplifier regulates the voltage to the MOSFET gate to maintain the voltage across the current sensing resistor R equal to VREF and hence a constant current. This action is independent of the DC voltage VDC.

Other current profiles can also be established depending upon the needs of the particular application. There can be applications where the load must present a constant horsepower over a wide speed range. To accomplish this the circuit of FIG. 13 is modified to the circuit of FIG. 14. In this circuit the reference VREF is compared to the product of the load current and the DC generated voltage VDC. The product of VDC and load current is proportional to power, and the action of the amplifier is to modulate the load current so as to maintain a constant power load.

Figure 14:
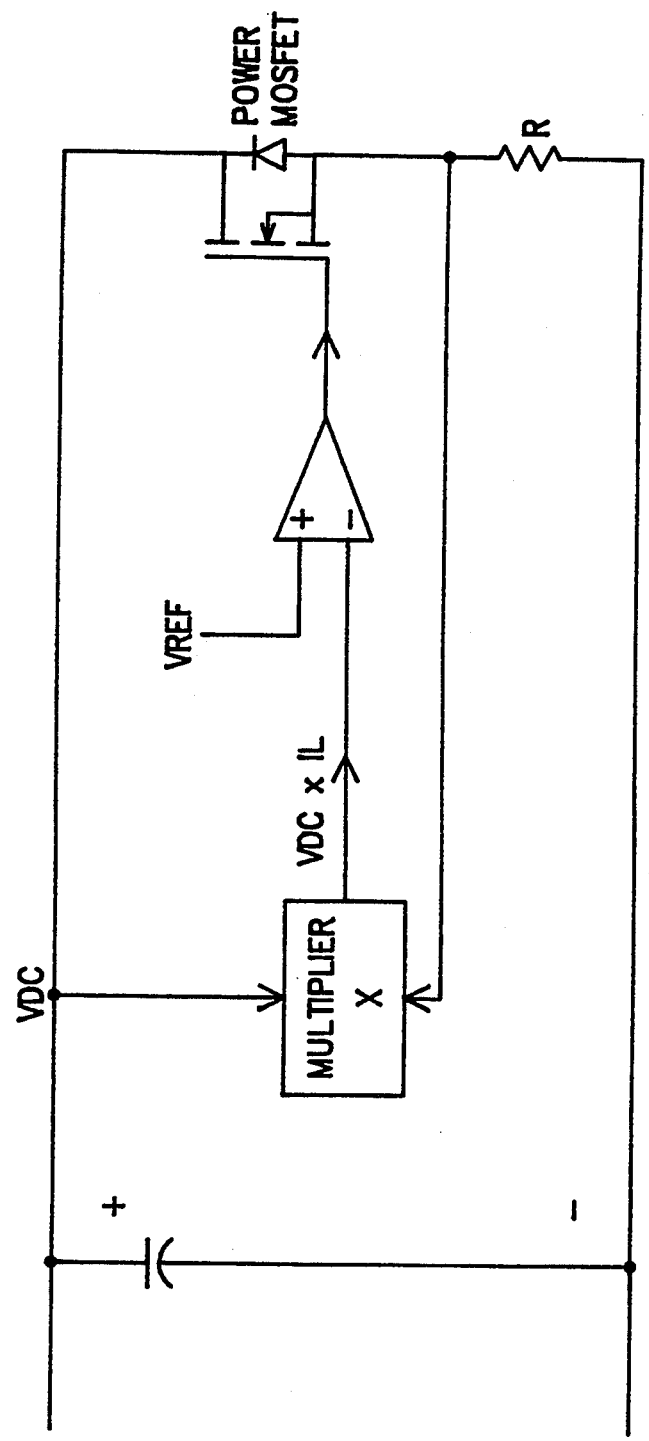
FIG. 14 is an electrical circuit to maintain a constant power load.

With reference to FIG. 15 a brushless generator 60 is configured with a permanent magnet housing 62 held stationary and the armature 61 allowed to rotate. The housing shell 62 and the armature 61 are substantially the same as that described in connection with FIGS. 1-4. The housing shell 62 is provided with an optional base 63 for a stationary mounting. To accomplish this the electronics of FIGS. 13 or 14, for example, are packaged as part of the rotor/armature. In the illustrated arrangement the electronic circuitry shown in FIG. 13 or FIG. 14 is packaged in a cylinder or on a disc 64 that is located on one shaft end 66 external to the housing 62. The wiring to the commutator segments 23 is brought along the flat on the shaft through the center of the bearing 67. With the power transistor of FIG. 13 or 14 mounted on a heat sink diagrammatically indicated at 68 that is located on the cylinder/disc, the cooling is enhanced because it acts as its own fan. The control electronics can be essentially the same as that described in FIGS. 13 or 14. If desired, a wireless non-contacting means can be implemented for adjustment of the reference voltage. For example, a phototransistor 65 can be mounted as part of the electronics packaged on the rotor/armature disc 64. External to this a light emitting photo diode 69 can be located to direct a beam of light to impinge upon the phototransistor 65. By modulating the light beam an increase/decrease signal can be communicated to the reference voltage circuit.

Many alternative methods that use different physics, such as magnetics, capacitance, or radio waves, can be employed as the wireless communication medium.

With the electronics packaged as part of the rotor/armature, both the armature and the housing with the permanent magnets can be free to rotate because neither have external wire attachments. This enables the unit 60 to be used as a loading device between two rotating shafts of moving parts of a machine. The tensioning or load would then act differentially between these two moving parts.

FIG. 16 illustrates a motor 70 with a unique configuration. The motor 70 has an armature 31 like that described in connection with FIGS. 1-4 but intended for rotation and an electronic circuit like that of FIG. 13 external of a housing shell or stator 72 in a disc 71 on the shaft or within the housing shell. The housing shell or stator 72 has a generally conventional polyphase winding 75. The stator 72 is wound, for example, as a three phase unit. When three phase power is applied, then a rotating magnetic field is established within the center core of the stator 72. This rotating magnetic field reacts with the armature 31 the same way as does the rotating housing with the permanent magnets described above. AC voltages are created in the armature winding 17 and are presented to the electronic circuit via the three wires 37-39 attached to the commutator segments 23.

Where the electronics is set up similar to that shown in FIG. 13, then a constant current will produce a constant torque on the rotor/armature 31. If the housing shell stator 72 is wound as a two pole field and the power frequency that is applied to the field winding is 60 HZ, then the synchronous speed of the rotating magnetic field is 3600 RPM.

If the rotor/armature 31 is free to rotate, then it will accelerate in the direction of the rotating magnetic field at a constant torque since the load current is being held constant. As the rotor 31 increases speed the magnitude of the induced voltages will decrease and the frequency will also decrease. When the voltage diminishes to the point where the current cannot be maintained then the rotor will idle at some speed less than synchronous. The motor is essentially an induction motor with an active rotor because of the built-in electronics.

Figure 17:
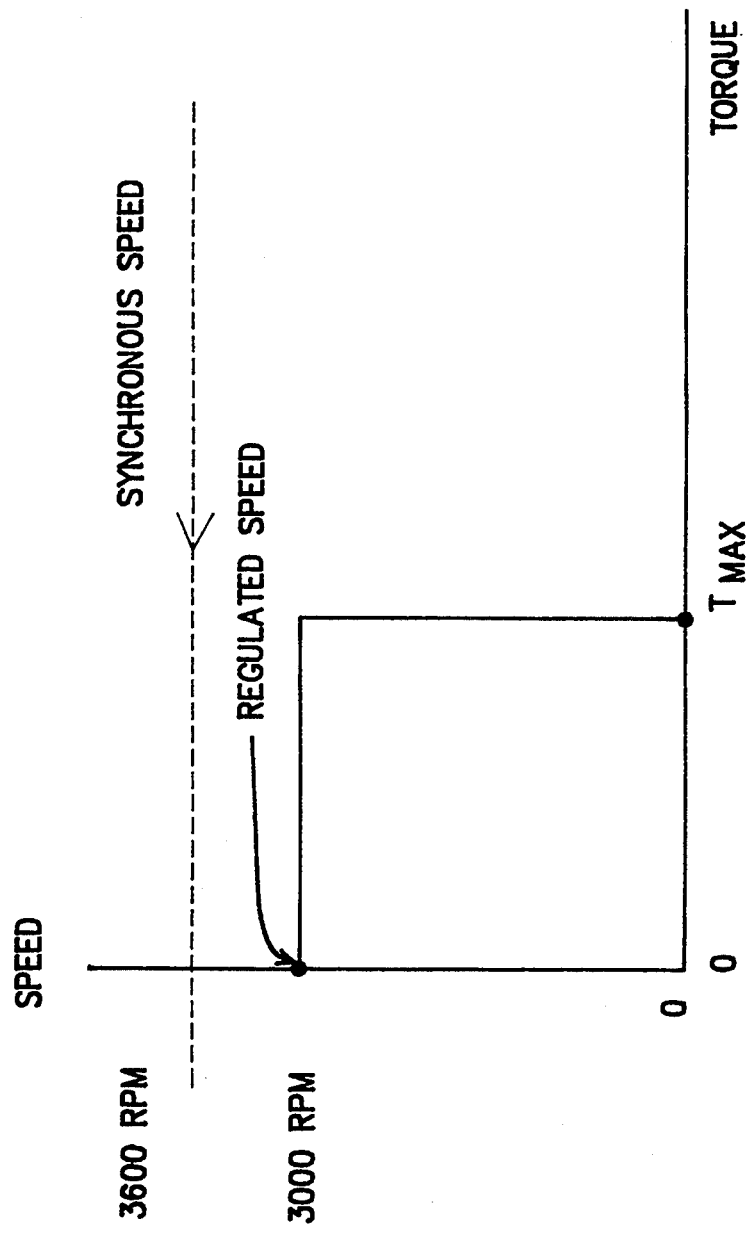
FIG. 17 illustrates a speed/torque curve for the motor of FIG; 16.

The frequency of the AC voltage induced in the rotor/armature is actually equal to the slip frequency, and the voltage amplitude is also proportional to the slip frequency. In order to have any power induced in the rotor there must be a slip speed. The control can be constructed such that the slip speed never falls below a specified amount. In fact, the control can provide a fixed torque for acceleration up to some speed below synchronous and then regulate at that speed. For example, the specified slip speed could be 10 HZ and the regulated speed would then be 3000 RPM. The speed/torque curve for this motor would be as shown in FIG. 17.

Figure 18:
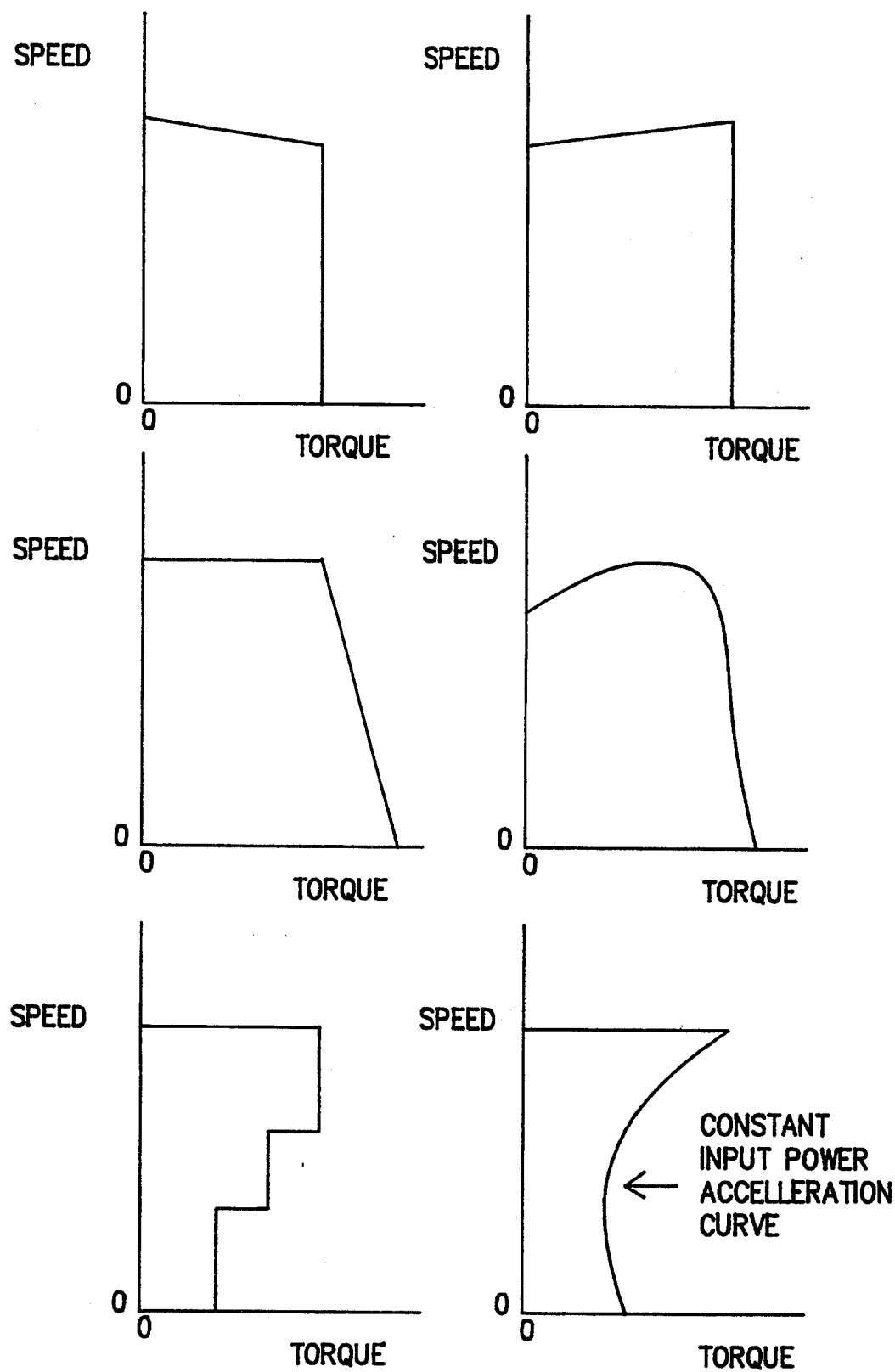
FIG. 18 illustrates different speed torque curves for the motor of FIG. 16.

The speed/torque can be contoured in many ways to satisfy the application at hand. The speed can be made to either rise or fall with increasing load torque and the acceleration torque could be made a function of speed also. FIG. 18 gives examples of the different curves.

The arbitrary design of speed/torque curves is now possible. A constant input power acceleration curve an also be designed. This limits the start-up line current and maintains it constant as the motor accelerates.

This motor 70 can also be made to operate so that its performance is equivalent to that of an eddy current clutch drive. In this case the constant current reference voltage, VREF as shown in FIG. 13, is controlled by wireless means from a remote control source. For example, a phototransistor 73 can be physically placed on the end of the shaft with a non-contacting light emitting photodiode 74 oppositely placed. By modulating the current in the photodiode 74 the emitted light beam will be correspondently modulated. The modulation contains the information to increase or decrease the voltage reference. The output shaft of the motor 70 develops a torque in direct proportion to the modulation controlled voltage reference. The speed of the shaft is free to change. The operating point is somewhere along the vertical leg of the speed/torque curve a shown in FIG. 17, but the TMAX value is variable in proportion to the external modulation signal. An advantage of this kind of control is that a small or low power control signal can control large amounts of electromechanical power. The disclosed motor is less complicated mechanically and less expensive to manufacture than conventional eddy current clutch drives.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. For example, the electronic controls for the type of dynamoelectric machines such as shown in FIGS. 15 and 16 can be disposed within their respective housings where desired. Accordingly, the patent is not to be limited in scope and effect to the specific embodiments herein shown and described nor in any other way that is inconsistent with the extent to which the progress in the art has been advanced by the invention.

I claim:

1. A dynamoelectric machine comprising a central armature with a core centered on an axis, the core having a periphery and a plurality of generally axially oriented slots spaced angularly about its periphery, a field winding in the core slots, the field winding comprising a plurality of separate coils, each of said coils being wound with a plurality of separate turns, each of said turns being in a pair of generally diametrally opposed slots, the coils each being electrically connected in a closed ring circuit that encircles the core axis, a set of three conductor leads connected to the ring circuit of coils, each of the conductor leads being connected at a point in the ring circuit that is angularly spaced on the ring circuit about 120° from the other of said leads, a housing shell surrounding the armature, bearing means for supporting the armature and the housing shell for relative rotation therewith, the housing shell and armature dynamoelectrically interacting when there is relative rotation between the housing shell and the armature and there is three phase electrical power in the winding.

2. A machine as set forth in claim 1, including an electronic circuit means for converting DC into three phase AC, said circuit means being connected to supply three phase electrical power to said three conductor leads.

3. A machine as set forth in claim 2, wherein said housing shell includes permanent magnet poles and is arranged to rotate on said bearing means about said armature, means for supporting said armature against rotation, said leads passing through said bearing means.

4. A machine as set forth in claim 2, wherein said electronic circuit means includes means to regulate to the frequency of said three phase power in response to the rotational speed of the housing shell.

5. A machine as set forth in claim 4, wherein said circuit means includes means to monitor the voltage waveform in the winding of said armature to control the frequency of the three phase power.

6. A machine as set forth in claim 5, wherein said voltage monitoring means is responsive to the waveform of the voltage.

7. A machine as set forth in claim 2, wherein said housing shell comprises an inductive sleeve and is arranged to rotate on said bearing means about said armature, means for supporting said armature against rotation, said leads passing through said bearing means.

8. A machine as set forth in claim 7, wherein said electronic circuit means includes means to control the frequency of the three phase power.

9. A machine as set forth in claim 1, wherein said housing shell includes permanent magnet poles, said armature being constructed and arranged to develop three phase electrical power in said three leads.

10. A machine as set forth in claim 9, including an electronic circuit means for regulating the amount of power generated by said armature.

11. A machine as set forth in claim 10, wherein said circuit means is powered by the electrical power generated by said armature.

12. A machine as set forth in claim 9, including an armature shaft extending through said bearing means, means supporting said housing shell against rotation, said leads extending through said bearing means, a control circuit for dissipating electrical power generated by said armature, said control circuit being supported on said shaft for rotation therewith outside of said housing shell, said circuit including means for powering its operation by power generated by said armature.

13. A machine as set forth in claim 12, wherein said circuit includes a non-contact control element responsive to a stationary modulating signal sources.

14. A machine as set forth in claim 1, wherein said housing shell has a polyphase winding, an electrical control circuit carried on said motor including means to modulate the mechanical power dynamoelectrically transferred to the armature from the housing shell.

15. A machine as set forth in claim 14, wherein said control circuit includes a non-contact responsive control element to modulate mechanical power transferred to said armature.

16. A dynamoelectric machine comprising a central armature with a core centered on an axis, the core having a periphery and a plurality of generally axially oriented slots spaced angularly about its periphery, a field winding in the core slots, the field winding comprising a plurality of separate coils, each of said coils being wound with a plurality of separate turns, each of said turns being in a pair of slots generally spaced within opposite poles, the coils each being electrically connected in a closed ring circuit that encircles the core axis, a set of three conductor leads connected to the ring circuit of coils, each of the conductor leads being connected at a point in the ring circuit that is angularly spaced on the ring circuit about 120 electrical degrees from the other of said leads, a housing shell surrounding the armature, bearing means for supporting the armature and the housing shell for relative rotation therewith, the housing shell and armature dynamoelectrically interacting when there is relative rotation between the housing shell and the armature and there is three phase electrical power in the winding.

* * * * *